United States Patent
Grass et al.

(10) Patent No.: US 12,433,562 B2
(45) Date of Patent: Oct. 7, 2025

(54) SCAN PARAMETER ADAPTION DURING A CONTRAST ENHANCED SCAN

(71) Applicant: KONINKLIJKE PHILIPS N.V., Eindhoven (NL)

(72) Inventors: Michael Grass, Buchholz in der Nordheide (DE); Rolf Dieter Bippus, Hamburg (DE); Thomas Koehler, Norderstedt (DE); Sandra Simon Halliburton, Shaker Heights, OH (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 1197 days.

(21) Appl. No.: 16/963,270

(22) PCT Filed: Jan. 17, 2019

(86) PCT No.: PCT/EP2019/051136
§ 371 (c)(1),
(2) Date: Jul. 20, 2020

(87) PCT Pub. No.: WO2019/141769
PCT Pub. Date: Jul. 25, 2019

(65) Prior Publication Data
US 2020/0337668 A1    Oct. 29, 2020

Related U.S. Application Data

(60) Provisional application No. 62/619,216, filed on Jan. 19, 2018.

(51) Int. Cl.
*A61B 6/00* (2024.01)
*A61B 6/03* (2006.01)
(Continued)

(52) U.S. Cl.
CPC .............. *A61B 6/545* (2013.01); *A61B 6/032* (2013.01); *A61B 6/0407* (2013.01);
(Continued)

(58) Field of Classification Search
CPC ....... A61B 6/545; A61B 6/032; A61B 6/0407; A61B 6/4233; A61B 6/467; A61B 6/504; A61B 6/481; A61B 6/482; A61B 6/488
See application file for complete search history.

(56) References Cited

U.S. PATENT DOCUMENTS 7,968,853 B2   6/2011   Altman
8,442,184 B2   5/2013   Forthmann
(Continued)

FOREIGN PATENT DOCUMENTS

DE   102005024323 A1   8/2006
WO   WO9918854          4/1999
(Continued)

OTHER PUBLICATIONS

CT-scan Image Production Procedures—NCBI Bookshelf; https://www.ncbi.nlm.nih.gov/books/NBK574548/ (Year: 2023).*
(Continued)

*Primary Examiner* — Chao Sheng
(74) *Attorney, Agent, or Firm* — Larry Liberchuk (57) ABSTRACT

A computed tomography imaging system (102) includes an X-ray radiation source (110) configured to emit X-ray radiation that traverses an examination region (108) and an X-ray radiation sensitive detector array (112) configured to detect X-ray radiation traversing the examination region and generate a view of line integrals. The imaging system further includes a subject support table top (118) configured to translate in the examination region for a scan based on at least one scan parameter. The imaging system further includes an operator console (122), which includes a pro-
(Continued)

cessor (128) and computer readable storage medium (130) with a scan parameter adapter module (132). The processor is configured to execute instructions of the scan parameter adapter module, which causes the processor to determine a contrast agent concentration from the view of line integrals and adjust the at least one scan parameter based on the determined concentration.

12 Claims, 4 Drawing Sheets

(51) Int. Cl.
  *A61B 6/04* (2006.01)
  *A61B 6/42* (2024.01)
  *A61B 6/46* (2024.01)
  *A61B 6/50* (2024.01)

(52) U.S. Cl.
  CPC ............ *A61B 6/4233* (2013.01); *A61B 6/467* (2013.01); *A61B 6/504* (2013.01); *A61B 6/481* (2013.01); *A61B 6/482* (2013.01); *A61B 6/488* (2013.01)

(56) References Cited

U.S. PATENT DOCUMENTS

| | | | |
|---|---|---|---|
| 8,565,371 B2 | 10/2013 | Bredno | |
| 8,879,817 B2 | 11/2014 | Mk | |
| 9,269,166 B2 | 2/2016 | Hansis | |
| 9,888,893 B2 | 2/2018 | Hoernig | |
| 9,952,300 B2 | 4/2018 | Giavazzi | |
| 9,955,934 B2 | 5/2018 | Vembar | |
| 2002/0010551 A1 | 1/2002 | Wang | |
| 2006/0034419 A1 | 2/2006 | Nishide | |
| 2006/0178836 A1 | 8/2006 | Bai | |
| 2007/0158573 A1* | 7/2007 | Deych | G01T 1/20183 250/370.11 |
| 2008/0119715 A1 | 5/2008 | Gonzalez Molezzi | |
| 2010/0183206 A1 | 7/2010 | Carlsen | |
| 2010/0322380 A1 | 12/2010 | Baeumer | |
| 2011/0274333 A1 | 11/2011 | Prevrhal | |
| 2012/0134464 A1 | 5/2012 | Hoernig | |
| 2017/0000440 A1 | 1/2017 | Okerlund | |
| 2017/0086772 A1* | 3/2017 | Vaz | A61B 6/54 |
| 2017/0209113 A1 | 7/2017 | Jackson | |
| 2018/0144466 A1* | 5/2018 | Hsieh | G06N 3/08 |

FOREIGN PATENT DOCUMENTS

| | | |
|---|---|---|
| WO | WO2009072056 A2 | 6/2009 |
| WO | WO2016097981 A1 | 6/2016 |
| WO | WO2016135044 A1 | 9/2016 |

OTHER PUBLICATIONS

Pharmacokinetics—Wikipedia; https://en.wikipedia.org/wiki/Pharmacokinetics (Year: 2025).*

PCT International Search Report, International application No. PCT/EP2019/051136, Apr. 25, 2019.

Cai Z. et al., "Adaptive Bolus Chasing Computed Tomography Angiography: Control Scheme and Experimental Results", Biomedical Signal Processing and Control, vol. 3, Issue 4, pp. 319-326, Oct. 2008.

* cited by examiner

SCAN PARAMETER ADAPTION DURING A CONTRAST ENHANCED SCAN

FIELD OF THE INVENTION

The following generally relates to imaging and more particular to adapting a scan parameter during a contrast enhanced scan using a contrast agent concentration estimation determined during the scan from acquisition data, and is described with particular application to computed tomography (CT) imaging, including non-spectral CT imaging and/or spectral CT imaging, and is amenable to other imaging modalities.

BACKGROUND OF THE INVENTION

A computed tomography (CT) scanner generally includes a rotating frame supporting an X-ray tube and a detector array, which are located opposite each other across an aperture of the frame that defines an examination region. For volumetric scanning, the rotating frame rotates while the X-ray tube emits radiation that traverses the examiner region and the detector array detects radiation that traverses the examiner region. The detector array outputs a signal indicative of the detected radiation, and the signal is processed to generate volumetric image data representative of the examination region and any object or subject disposed therein.

Contrast enhanced imaging procedure such as CT angiography include scanning a subject that has been administered a radiocontrast agent to image the distribution of the contrast agent in the cardiovascular system. In one example, this includes using an injector with a single, bi or multi-phasic injection protocol or a catheter to administer the agent via a vein in an arm and/or other entry point. Where a contrast agent bolus is administered, for a given location in the cardiovascular system upstream from the injection site, contrast agent will initially be absent. The amount of contrast agent at that location will increase as the contrast agent distributes and enters the location (uptake) up to a peak amount (peak enhancement) and then decrease as the contrast agent exits the location (washout). In one instance, the scan is configured to track peak enhancement during the scan.

However, the distribution speed of the contrast agent in the cardiovascular system depends on multiple factors such as a cardiac performance of the subject, cardiovascular disease, subject specific anatomy, and an injection site and flow rate, to name a few. As a consequence, the scan may miss peak contrast enhancement at least some time during the scan for a given set of scan parameters. Unfortunately, the resulting volumetric image data will not include peak enhancement at that time(s), which could negatively impact the assessment of an extent of an occlusion and/or coronary artery disease from the resulting reconstructed volumetric image data.

SUMMARY OF THE INVENTION

Aspects described herein address the above-referenced problems and others.

In one aspect, a computed tomography imaging system includes an X-ray radiation source configured to emit X-ray radiation that traverses an examination region and an X-ray radiation sensitive detector array configured to detect X-ray radiation traversing the examination region and generate a view of line integrals. The imaging system further includes a subject support table top configured to translate in the examination region for a scan based on at least one scan parameter. The imaging system further includes an operator console, which includes a processor and computer readable storage medium with a scan parameter adapter module. The processor is configured to execute instructions of the scan parameter adapter module, which causes the processor to determine a contrast agent concentration from the view of line integrals and adjust the at least one scan parameter based on the determined concentration.

In another aspect, a method includes receiving views of projection data during a CT angiogram, determining, for one or more of the views, an amount of contrast agent in a current scan plane, and adjusting a scan parameter of the CT angiogram in response to the amount of contrast agent not satisfying a pre-determined condition.

In another aspect, a computer readable medium is encoded with computer executable instructions, which, when executed by a processor of a computer, cause the processor to: receive views of projection data during a CT angiogram, determine, for one or more of the views, an amount of contrast agent in a current scan plane, and adjust a scan parameter of the CT angiogram in response to the amount of contrast agent not satisfying a pre-determined condition.

BRIEF DESCRIPTION OF THE DRAWINGS

The invention may take form in various components and arrangements of components, and in various steps and arrangements of steps. The drawings are only for purposes of illustrating the preferred embodiments and are not to be construed as limiting the invention.

DETAILED DESCRIPTION OF EMBODIMENTS

Figure 1:
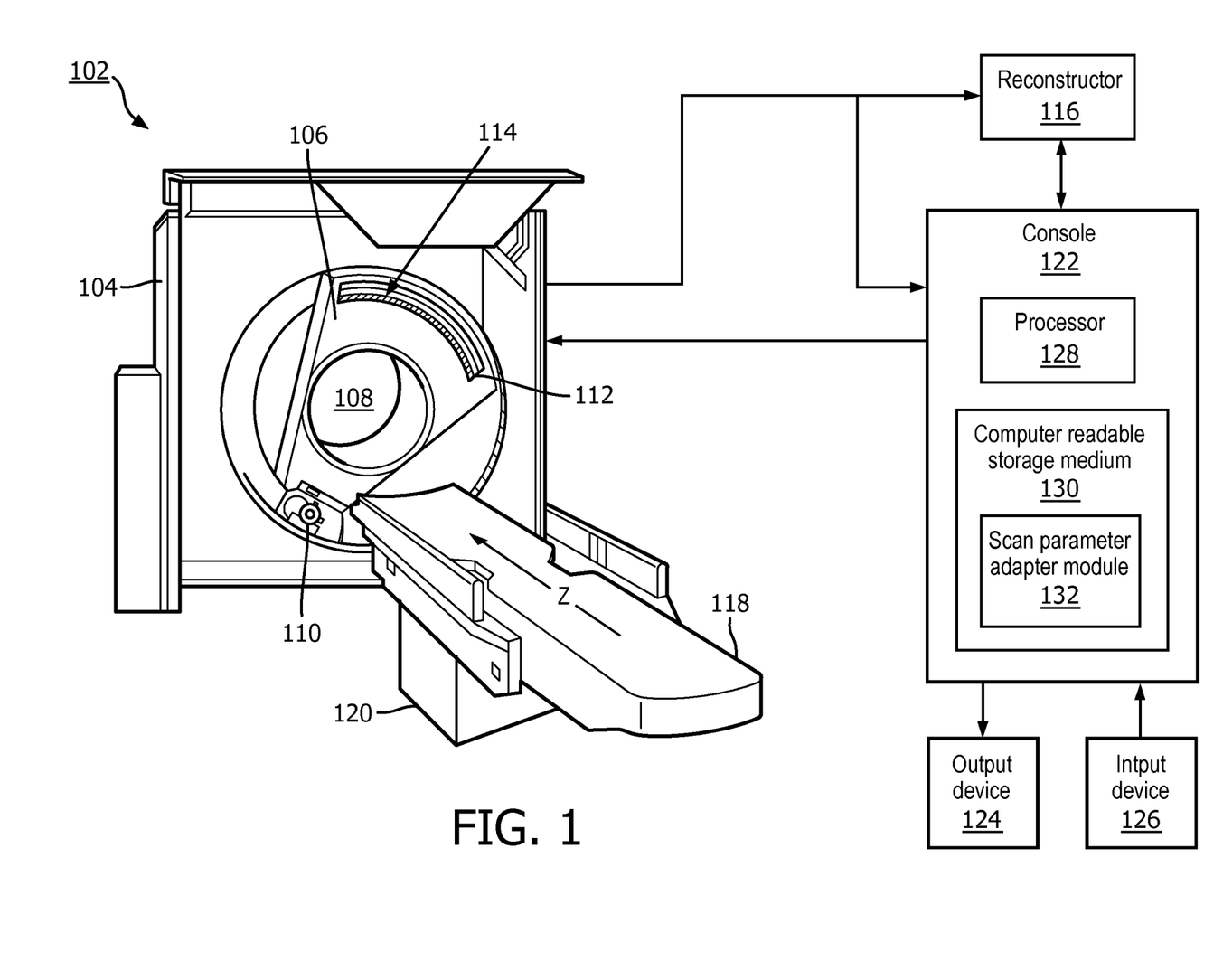
FIG. 1 schematically illustrates an example CT imaging system with a scan parameter adapter module.

FIG. 1 schematically illustrates an imaging system 100 such as a computed tomography (CT) scanner.

The imaging system 102 includes a generally stationary gantry 104 and a rotating gantry 106. The rotating gantry 106 is rotatably supported by the stationary gantry 104 (e.g., via a bearing or the like) and rotates around an examination region 108 about a longitudinal or rotational axis (z-axis). An X-ray source 110, such as an X-ray tube, is rotatably supported by the rotating gantry 104, rotates in coordination with the rotating gantry 104, and emits X-ray radiation. The X-ray source 110 includes a collimator that shapes the emitted X-ray radiation to form a beam (e.g., a fan, a wedge, a cone, etc. shape beam) that traverses the examination region 108.

A radiation sensitive detector 112, which includes a one- or two-dimensional array of rows of detector elements 114, is rotatably supported by the rotating gantry 104 along an arc opposite the X-ray source 110 and across the examination region 108. As the detector 112 rotates, the detector elements 114 detect radiation over consecutive arc segments (integrations periods) along a rotation path. For each arc segment, each detector element generates an electrical signal indicative of a total X-ray attenuation along a path from the X-ray source 110 to the detector element (a line integral). The set of line integrals for an arc is referred to herein as a view, and the set of views is referred to herein as projection data.

In a variation, the imaging system 102 is configured for spectral (multi-energy) imaging. For example, the radiation sensitive detector 112 may include an energy-resolving detector such as a multi-layer scintillator/photo-sensor detector (e.g., U.S. Pat. No. 7,968,853 B2, which is incorporated herein by reference in its entirety) and/or a photon counting (direct conversion) detector (e.g., WO2009072056A2, which is incorporated herein by reference in its entirety). In this instance, the X-ray source 110 can include a broadband source, kVp switching (e.g., U.S. Pat. No. 8,442,184 B2, which is incorporated herein by reference in its entirety) and/or multiple X-ray tubes (e.g., U.S. Pat. No. 8,442,184 B2).

In another variation, the imaging system 102 is configured for phase contrast imaging. An example of a CT scanner configured for phase contrast imaging is described in U.S. Pat. No. 8,565,371 B2, filed Dec. 8, 2010, and entitled "Rotational X ray device for phase contrast imaging," which is incorporated herein by reference in its entirety. An example of a CT scanner configured for phase contrast imaging is described in US 2010/0322380 A1, filed Aug. 9, 2010, and entitled "X-ray detector for phase contrast imaging," which is incorporated herein by reference in its entirety.

A reconstructor 116 reconstructs the projection data and generates volumetric image data. For non-spectral projection data, the reconstructor 116 produces conventional broadband (non-spectral) volumetric image data. With spectral projection data, the reconstructor 116 produces conventional broadband (non-spectral) volumetric image data and/or spectral volumetric image data. The spectral volumetric image data may include at least a contrast (e.g., iodine) concentration map. Examples of other data include, but are not limited to, mono-energetic image data, effective Z (atomic number) image data, photo-electric effect and Compton scattering image data, and/or other image data.

A subject support, such as a couch, includes a table top 118 moveably coupled to a frame/base 120. In the illustrated example, the table top 118 is slideably coupled to the frame/base 120 via a bearing or the like. A drive system (not visible) including a controller, a motor, a lead screw, and a nut (or other drive system) translates the table top 118 along the frame/base 120 into and out of the examination region 108. The table top 118 is configured to support an object or subject in the examination region 108 so as to guide the subject or object with respect to the examination region 108 for loading, scanning, and/or unloading the subject or object.

A computing system or computer serves as an operator console 122, and includes a human readable output device 124 such as a display, an input device 126 such as a keyboard, mouse, etc., a processor 128 (e.g., a microprocessor, a central processing unit (CPU), etc.), and computer readable storage medium 130, which includes non-transitory medium (hardware memory) and excludes transitory medium (signals, carrier waves, and the like). Software resident on the operator console 122 (e.g., in the computer readable storage medium 130) allows an operator to control an operation of the system 102, including selecting an imaging protocol, setting scan parameters, etc.

The illustrated computer readable storage medium 130 includes at least a scan parameter adapter module 132, which includes instructions for adapting a scan parameter(s) (e.g., table top 118 speed, pitch for helical scanning, acquisition timing/duration for axial scanning, frame rate for sparse sampling, rotation speed, etc.) during a scan. As described in greater detail below, in one instance the scan parameter is adapted for a CT angiography scan so that a contrast concentration around peak concentration (or other desired level) is imaged at one or more (e.g., all) slice planes of the scan. In one instance, this can be achieved while maintaining anatomic specific requirements of the scan protocol, e.g., ECG-gated acquisition at the heart, and non-ECG-gated acquisition in the rest of the scan area.

Figure 2:
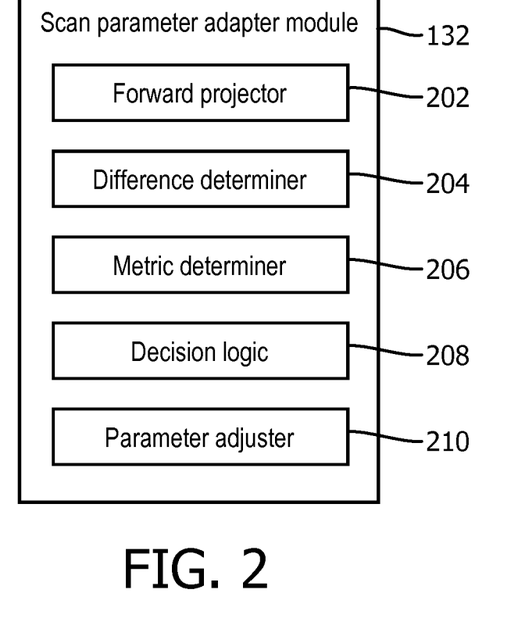
FIG. 2 schematically illustrates an example of the scan parameter adapter module for non-spectral projection data.

FIG. 2 schematically illustrates an example of the scan parameter adapter module 132 for adapting scan parameters during a CT angiogram with non-spectral projection data. The non-spectral projection data is produced by a non-spectral scanner or by combining spectral projection data produced by a spectral scanner. In this example, the scan parameter adapter module 132 includes a forward projector 202, a difference determiner 204, a metric determiner 206, decision logic 208, and a parameter adjuster 210. The scan parameter adapter module 132 receives non-contrast enhanced volumetric image generated during a pre-scan.

For this, in one instance, a 3D scan is performed with sparse angular sampling. For example, where full angular sampling includes emitting and detecting X-ray radiation for each of N views per rotation, with sparse angular sampling, X-rays are emitted and detected for only a sub-set (less then N) of these views, e.g., every $10^{th}$, $16^{th}$, $20^{th}$, etc. view. In another instance, the 3D scan is performed with full angular sampling. Scan parameters such as mAs (X-ray intensity as the product of X-ray tube current in milliamperes (mA) and exposure time in seconds (S)) can be set so that patient radiation dose is no greater than that for a 2D scanogram (also referred to as a surview, a scout, a pilot, etc.).

The projection data produced by the detector array 112 is reconstructed by the reconstructor 116 to generate volumetric image data. The operator console 122 receives the pre-scan volumetric image data. A user of the operator console 122 plans the angiogram using the pre-scan volumetric image data. For this, the volumetric image data is displayed via the output device 124 and the user plans the angiogram using the input device 126. The planning may include identifying a start scan position and at least one of an extent of the scan or an end scan position, selecting parameters such as pitch, mAs, kV (X-ray tube mean kilovoltage), employing automatic and/or semi-automatic tissue segmentation, etc.

During the angiogram, the operator console 122 receives views of projection data as they are acquired. The forward projector 202, for a received view forward projects the pre-scan volumetric image data (all or a sub-set thereof) to estimate line integrals corresponding to a same angular position as the received view. This may include estimating the entire view, or lines integrals and/or sub-portions of the view corresponding to a particular pre-determined region of interest (ROI). The ROI can be determined, e.g. from an image based ROI as determined by an operator and/or an automatic segmentation algorithm from the prescan and translated to the projection/view ROI by forward projection using the forward projector. The difference determiner 204 computes a difference between the acquired and estimated views. Generally, the difference represents an amount of contrast agent present since the pre-scan is a non-contrast enhanced scan whereas the angiogram is a contrast enhanced scan.

The metric determiner 206 computes a metric from the differences in the line integrals of the views. In one example, the metric is computed by summing all of the differences or only those for a predetermined sub-region of the views. In one instance, the metric is computed with data from a single slice/row of detectors. In another instance, the metric is computed with data from multiple slices/rows of detectors, e.g., where the detector array 112 is configured with multiple rows of detectors. The decision logic 208 determines whether the metric satisfies a pre-determined condition. The condition can be a value plus or minus a given tolerance, a range, etc. In one embodiment, a motion correction algorithm (e.g., elastic 2D-3D registration) is employed. In one example, this algorithm limits differences between the forward projected pre-scan and the actual scan to those generated by the contrast agent. In one instance, this mitigates non-contrast-agent caused differences due to motion in-between the forward projected pre-scan and the actual scan.

The parameter adjuster 210 adapts at least one scan parameter (e.g., table top 118 speed, etc.) in response to the metric not satisfying the pre-determined condition. In one instance, the pre-determined condition identifies an amount of contrast agent or contrast agent concentration. In this instance, the parameter(s) is adjusted such that a pre-determined amount of contrast agent (e.g., peak agent concentration) is represented in subsequent acquired projections. In general, the parameter adjuster 210 does not adapt the scan parameters when the metric satisfies the pre-determined condition. However, scan parameters can be adjusted in this situation, if desired.

For example, historical values of the metric over time may indicate the metric is more likely than not to fail the pre-determined condition at a subsequent scan plane. In this instance, a scan parameter can be proactively adjusted. In another example, contrast agent administration information such as flow rate, concentration, needle size, saline chaser, etc., patient information such as weight, height, heart rate, etc. scan information such as tube potential (kVp), virtual monoenergy (keV), scan distance, etc., and/or other information are utilized to adjust the scan parameter. In another variation, the module 132 uses an anatomical model which contains information on mean contrast agent amount per body slices relative to normalized values at a certain body height.

The above processing of forward projecting the pre-scan volumetric image data, determining differences between measured and estimated line integrals, determining a metric based on the differences, and adjusting scan parameters based on the pre-determined condition is repeated for one or more views during the scan. In general, this allows imaging peak contrast concentration or a range around peak contrast concentration (or other predetermined level or range of the bolus) as the contrast agent bolus distributes through the cardiovascular system.

Figure 3:
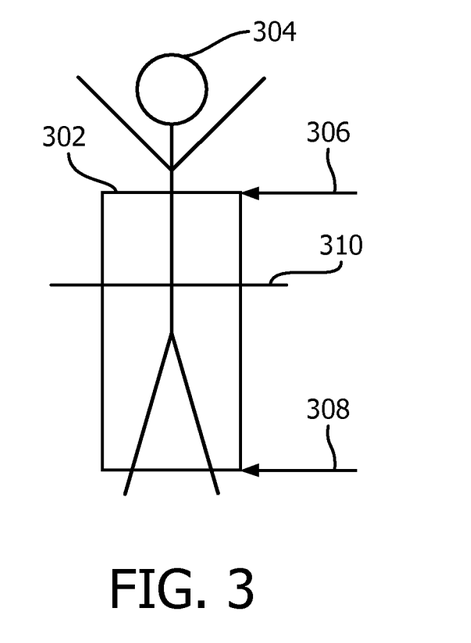
FIG. 3 illustrates an example scan plan in connection with a subject.
Figure 4:
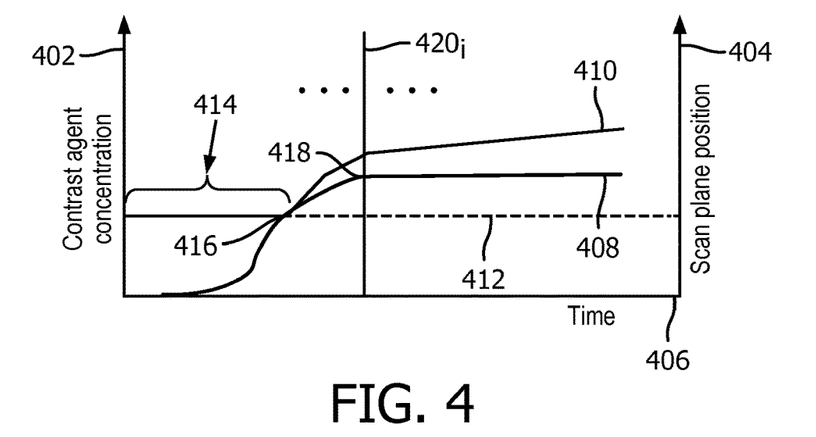
FIG. 4 illustrates an example of a desired scenario where a contrast concentration of interest is captured during an entirety of the volume.
Figure 5:
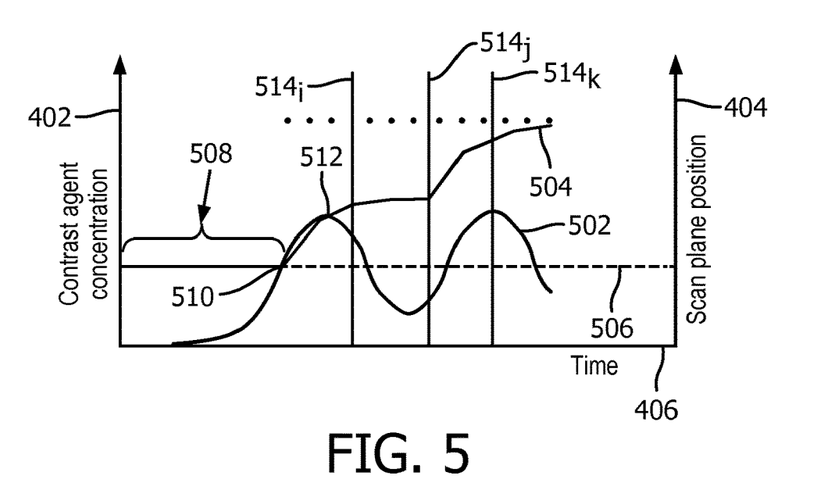
FIG. 5 schematically illustrates an example of adjusting a speed of the subject support through a control loop feedback mechanism for a setpoint set to peak contrast concentration.

FIGS. 3 and 4 show an example of a desired scenario where peak contrast concentration is captured during a scan, and FIGS. 3 and 5 show an example of adjusting the speed of the table top 118 (scan speed) through a control loop feedback mechanism for a setpoint set to peak contrast concentration. In FIGS. 4 and 5, a first axis 402 represents an integral of contrast agent concentration, a second axis 404 represents a position of the scan plane, and a third axis 406 represents time.

FIG. 3 shows a scan plan 302 for a patient 304. The scan plan 302 includes a start scan position 306 and an end scan position 308. Scanning begins at the start scan position 306 and ends at the end scan position 308. To scan the volume 302, the table top 118 moves the patient 304 into the examination region 108. In this example, scanning begins at the start scan position 306 at the time of the administration of the contrast bolus or shortly thereafter (static table top 118 position), and the scan of the volume begins when an amount of contrast agent at that position reaches a predetermined threshold level, which triggers the table top 118 to move the patient 304 at a predetermined rate defined in the scan protocol. FIG. 3 shows a current scan plane 310 at about one third of the way into the scan plan 302. In one instance, the predetermined rate is planned based on a "normal" scan protocol. In a variation, it is based on the "normal" contrast agent speed for an average patient. In a variation, the scan begins after a predetermined time duration from administration of the contrast bolus and/or otherwise.

In FIG. 4, a first curve 408 represents contrast agent concentration as a function of time, and a second curve 410 represents scan plane position as a function of time. FIG. 4 also shows a predetermined threshold level of contrast agent concentration 412 to trigger the scan of the volume of the patient 304. During a time interval 414, contrast agent concentration increases over time at the start position 306 as the bolus advances, but is below the predetermined threshold level 412, and the table top 118 remains at the start position 306.

After the contrast agent concentration reaches the predetermined threshold level 412 at 416, the table top 118 begins to move at the rate in the scan protocol, advancing the scan plane position as shown by the curve 410. In this embodiment, the predetermined rate is such that peak contrast concentration 418 is captured at a desired scan plane 420, and subsequent scan planes during the volume scan as indicated by the curve 408 after 418 and the linear increase in the scan plane position indicated by the curve 410.

In general, a contrast agent bolus does not travel through the cardiovascular system at a constant rate as shown in FIG. 4 where peak contrast concentration is captured at all scan planes for a same constant table top 118 speed. Furthermore, disease such as atherosclerosis and/or another cardiovascular system disease(s) may alter flow characteristics of the flow of the contrast agent bolus.

In FIG. 5, a first curve 502 represents contrast agent concentration as a function of time, and a second curve 504 represents scan plane position as a function of time. FIG. 5 also shows a predetermined threshold level of contrast agent concentration 506 to trigger the scan of the volume of the patient 304. During a time interval 508, contrast agent concentration increases over time at the start position 306 as the bolus advances, but is below the predetermined threshold level 506. After the contrast agent concentration reaches the predetermined threshold level 506 at 510, the table top 118 begins to move at the rate in the scan protocol, advancing the scan plane position.

In this example, the contrast agent concentration is below peak concentration 512 at a scan plane $514_i$. As described herein, the scan parameter adapter module 132 detects this, e.g., through evaluating a change in contrast agent concentration from one or more previous scan planes and/or otherwise. At $514_i$, the scan parameter adapter module 132 detects the contrast agent concentration is decreasing from scan plane to scan plane, indicating the table top 118 needs to slow down and the scan plane 514$_i$ is in front of peak contrast concentration 512. In response thereto, the scan parameter adapter module 132 decreases the speed of the table top 118, which is indicated by the decreased slope of the curve 504 after the scan plane 514$_i$.

For a scan plane 514$_j$, the module 132 detects the contrast agent concentration is increasing from scan plane to scan plane, indicating the subject support 118 needs to speed up and the scan plane is behind peak contrast concentration. In response thereto, the module 132 increases the speed of the table top 118, which is indicated by the increased slope of the curve 504 after the scan plane 514$_j$. For a scan plane 514$_k$, the module 132 detects the contrast agent concentration is not changing or is changing only within the given tolerance from scan plane to scan plane, indicating the scan plane is capturing peak contrast concentration with the current table top 118 speed, which is indicated by the continuation of same slope of the curve 504 after the scan plane 514$_k$.

It is to be understood that the sinusoidal nature of the contrast agent concentration curve 502 in FIG. 5 is for explanatory purposes to show scenarios in which the speed of the table top 118 is increased and decreased, and is not limiting. For example, in the curve can alternatively be irregular or oscillate by way of another pattern. In general, the contrast agent flow characteristics will vary as it advances and the feedback mechanism will adapt the table top 118 speed in response thereto. The frequency of the adaption depends on how often a scan plane is evaluated to determine if peak contrast concentration is being imaged.

In the above examples, the decision to decrease/increase the speed of the subject support 118 and/or the amount of the decrease/increase in the speed of the subject support 118 depends on a gradient of per slice contrast agent concentration. In a variation, the decision is made based on an amount of contrast agent concentration, the pre-determined condition is a threshold value, and the concentration is compared to the predetermined threshold value by the decision logic 208.

In another variation, the integral curves 410 and/or 504 of FIGS. 4 and 5 are convolved with a kernel, e.g. a Gaussian or other kernel, to reduce an effect of local contrast agent concentration variations.

Where the predetermined table top 118 rate is based on the "normal" contrast agent speed for an average patient, the approach described herein corrects for deviations of the actual patient from the mean patient.

Figure 6:
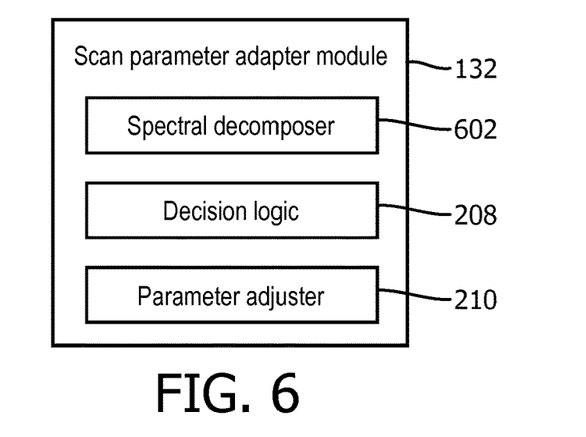
FIG. 6 schematically illustrates an example of the scan parameter adapter module for spectral projection data.

FIG. 6 illustrates an example of the scan parameter adapter module 132 for adapting scan parameters during a CT angiogram with spectral projection data. In this example, the scan parameter adapter module 132 includes a spectral decomposer 602, the decision logic 208, and the parameter adjuster 210. During the angiogram, operator console 122 receives views of spectral projection data, as described herein.

The spectral decomposer 602 decomposes the spectral projection data based on energy into at least two difference spectral components, including at least a contrast agent (e.g., iodine) map, which indicates a concentration of the contrast agent for the view. Examples of spectral decomposition are described in WO2016135044A1, filed Sep. 1, 2016, and entitled "A method for the reconstruction of quantitative iodine maps using energy resolved tomography," and WO2016097981A1, filed Dec. 14, 2015, and entitled "Penalized Maximum Likelihood Material Decomposition," which are incorporated herein in their entireties by reference. Other approaches are also contemplated herein.

The decision logic 208 determines whether the concentration of the contrast agent, as indicated in the contrast agent map, satisfies the pre-determined condition, e.g., as described above and/or otherwise. The parameter adjuster 210 adjusts at least one scan parameter in response to the concentration not satisfying the pre-determined condition, e.g., as described above and/or otherwise. The parameter adjuster 210 can also adjust the scan parameters in response to the concentration satisfying the pre-determined condition, e.g., as described above and/or otherwise.

Figure 7:
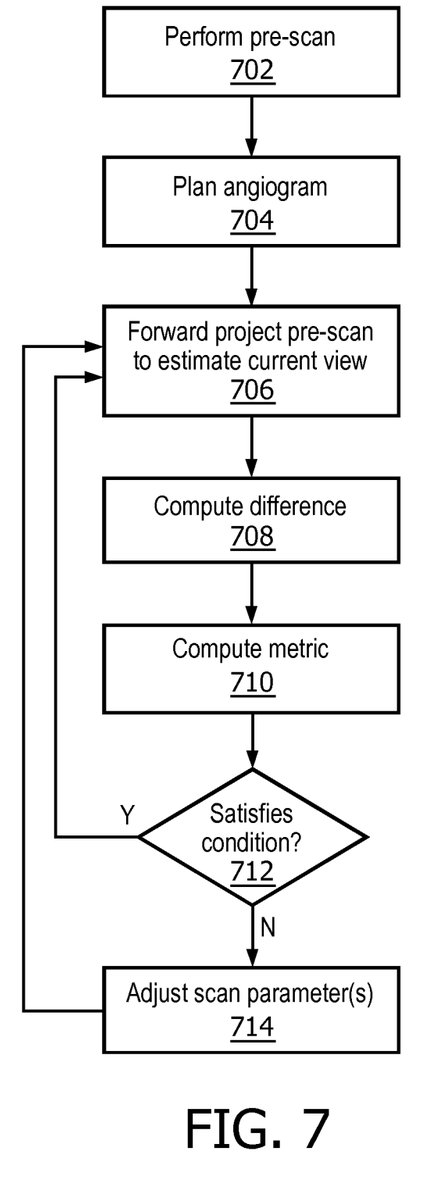
FIG. 7 illustrates an example method for adapting scan parameters for non-spectral projection data.

FIG. 7 illustrates an example method for adapting scan parameters during a CT angiogram from non-spectral data.

At 702, a pre-scan is performed, as described herein and/or otherwise.

At 704, an angiogram is planned with the pre-scan data, as described herein and/or otherwise.

At 706, during the angiogram, for an acquired view, the pre-scan data is forward projected to estimate line integrals for the same view, as described herein and/or otherwise.

At 708, a difference is computed between the acquired and estimated views, as described herein and/or otherwise.

At 710, a metric is computed from the difference, as described herein and/or otherwise.

At 712, is it determined whether the metric satisfies a pre-determined condition.

If the metric satisfies the pre-determined condition, then acts 706-712 are repeated for another view.

If the metric does not satisfy the pre-determined condition, then at 714 a scan parameter(s) is adjusted such that a predetermined level of contrast agent is represented in the subsequent acquired views, as described herein and/or otherwise, and acts 706-712 are repeated.

Figure 8:
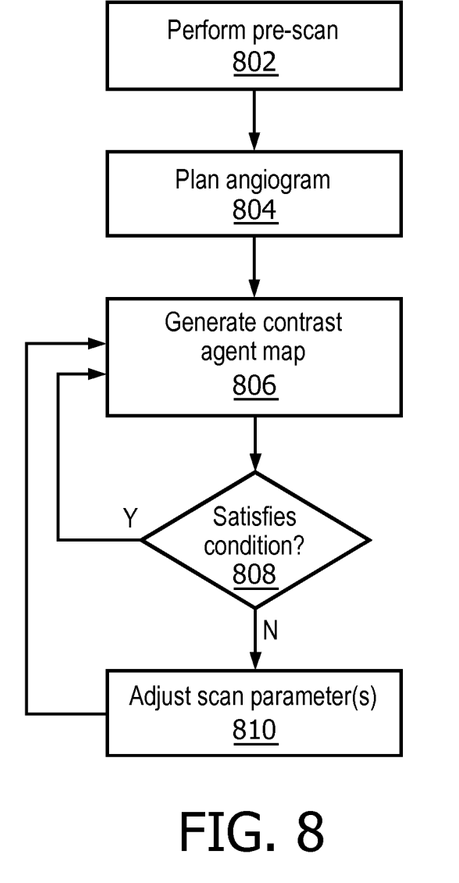
FIG. 8 illustrates an example method for adapting scan parameters for spectral projection data.

FIG. 8 illustrates an example method for adapting scan parameters during a CT angiogram for a spectral data.

At 802, a pre-scan is performed, as described herein and/or otherwise.

At 804, an angiogram is planned with the pre-scan data, as described herein and/or otherwise.

At 806, during the angiogram, for an acquired view, a contrast agent (e.g., iodine) map is generated, as described herein and/or otherwise.

At 808, is it determined whether the amount of contrast agent indicated in the contrast map satisfies a pre-determined threshold.

If the metric satisfies the pre-determined threshold, then acts 806-808 are repeated.

If the metric does not satisfy the pre-determined threshold, then at 810 a scan parameter(s) is adjusted such that a predetermined level of contrast agent is represented in the subsequent acquired views, as described herein and/or otherwise, and acts 806-808 are repeated.

In one instance, the approached described herein may be implemented by an explicit algorithm as it has been described above, or otherwise a machine learning or deep learning method may be used to train a neural network to adapt the scan speed during the scan. Here, a large data set of patient scans and patient parameters together with the CT acquisition and contrast application parameters can be used as an input for the training in combination with human reader or automatic image quality measure data. The trained neural network is than applied during the scan to adapt the scan speed.

The above may be implemented by way of computer readable instructions, encoded or embedded on computer readable storage medium (which excludes transitory medium), which, when executed by a computer processor(s) (e.g., CPU, microprocessor, etc.), cause the processor(s) to carry out acts described herein. Additionally, or alternatively, at least one of the computer readable instructions is carried by a signal, carrier wave or other transitory medium, which is not computer readable storage medium.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage.

A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A computed tomography system for non-spectral and spectral imaging, comprising:
   an X-ray radiation source configured to emit X-ray radiation that traverses an examination region;
   an X-ray radiation sensitive detector array configured to detect X-ray radiation traversing the examination region and generate a view of line integrals;
   a subject support table top configured to translate in the examination region for a scan based on at least one scan parameter, wherein the at least one scan parameter is a speed of the subject support table top; and
   at least one processor configured to:
      determine a contrast agent concentration from the view of line integrals;
      adjust the at least one scan parameter based on the determined concentration;
      forward project pre-scan volumetric image data to estimate a view of line integrals corresponding to a same angular position as the generated view of line integrals; and
      adjust the at least one scan parameter based on a difference between the estimated and generated views of line integrals; and
   a neural network configured to adjust the at least one scan parameter, wherein the neural network is trained with a machine or deep learning algorithm to adapt the speed of the subject support table top during a scan based on the contrast agent concentration.

2. The system of claim 1, wherein the at least one processor is further configured to determine the difference between the estimated and generated views of line integrals and adjust the at least one scan parameter based on a metric from all of the differences between the line integrals of the views or only those for a predetermined sub-region of the views.

3. The system of claim 1, wherein the X-ray radiation sensitive detector array is a multi-layer energy resolving detector array, and the at least one processor is further configured to spectrally decompose the views of line integrals to generate a contrast agent map and adjust the at least one scan parameter based on the contrast agent map.

4. The system of claim 1, wherein the X-ray radiation sensitive detector array includes one or more rows of detectors, and the view of line integrals includes lines integrals for a single row of detectors.

5. The system of claim 1, wherein the X-ray radiation sensitive detector array includes multiple rows of detectors, and the view of line integrals includes lines integrals for one of a single row of detectors and multiples rows of detectors.

6. The system of claim 1, wherein the at least one scan parameter is adjusted so that a subsequent current view images a peak contrast concentration.

7. The system of claim 1, wherein the at least one processor is configured to adjust the at least one scan parameter based on at least one of contrast agent administration information and patient physiological information.

8. The system of claim 1, wherein the neural network is trained with at least one of image data from patient scans, patient information of patients for the patient scans, acquisition for the patient scans and contrast agent parameters for the patient scans as input, and image quality criteria.

9. A computer implemented method for computed tomography imaging, comprising:
   providing an X-ray radiation source configured to emit X-ray radiation that traverses an examination region;
   providing an X-ray radiation sensitive detector array configured to detect X-ray radiation traversing the examination region and generate a view of line integrals;
   providing a subject support table top configured to translate in the examination region for a scan based on at least one scan parameter, wherein the at least one scan parameter is a speed of the subject support table top;
   determining a contrast agent concentration from the view of line integrals;
   adjusting the at least one scan parameter based on the determined concentration;
   forwarding project pre-scan volumetric image data to estimate a view of line integrals corresponding to a same angular position as the generated view of line integrals;
   adjusting the at least one scan parameter based on a difference between the estimated and generated views of line integrals;
   providing a neural network configured to adjust the at least one scan parameter, wherein the neural network is trained with a machine or deep learning algorithm to adapt the speed of the subject support table top during a scan based on the contrast agent concentration.

10. The method of claim 9, further comprising:
    injecting iodine as a contrast agent;
    decomposing the one or more of the views to generate an iodine map; and
    determining the amount of the contrast agent from the iodine map.

11. A non-transitory computer-readable medium for storing executable instructions, when executed by a processor, cause a method to be performed for computed tomography imaging, the method comprising:
    providing an X-ray radiation source configured to emit X-ray radiation that traverses an examination region;

providing an X-ray radiation sensitive detector array configured to detect X-ray radiation traversing the examination region and generate a view of line integrals;

providing a subject support table top configured to translate in the examination region for a scan based on at least one scan parameter, wherein the at least one scan parameter is a speed of the subject support table top;

determining a contrast agent concentration from the view of line integrals;

adjusting the at least one scan parameter based on the determined concentration;

forwarding project pre-scan volumetric image data to estimate a view of line integrals corresponding to a same angular position as the generated view of line integrals; and adjusting the at least one scan parameter based on a difference between the estimated and generated views of line integrals; and providing a neural network configured to adjust the at least one scan parameter, wherein the neural network is trained with a machine or deep learning algorithm to adapt the speed of the subject support table top during a scan based on the contrast agent concentration.

12. The non-transitory computer readable medium of claim 11, wherein the method further comprises:

injecting iodine as a contrast agent;

decompose the one or more of the views to generate an iodine map; and determine the amount of the contrast agent from the iodine map.

* * * * *